Dec. 3, 1935.  R. R. GLEN  2,022,909
SHAFT COUPLING
Filed Oct. 16, 1934  3 Sheets-Sheet 1
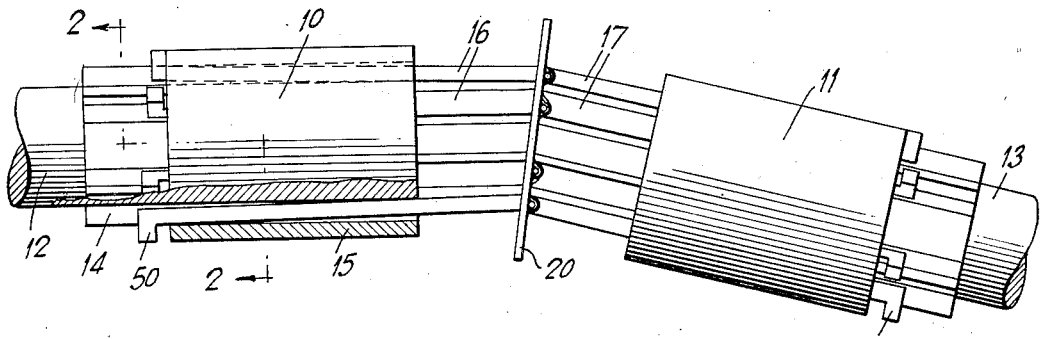
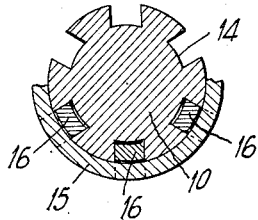
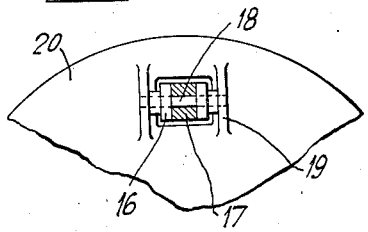
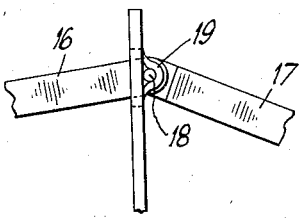
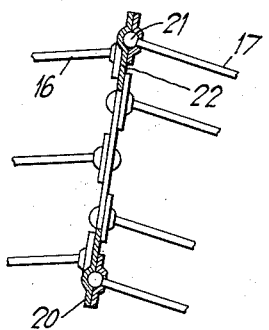
INVENTOR
Robert Rodger Glen
BY
Watson, Bristol, Johnson & Leavenworth
ATTORNEYS Dec. 3, 1935. R. R. GLEN 2,022,909
SHAFT COUPLING
Filed Oct. 16, 1934 3 Sheets-Sheet 2
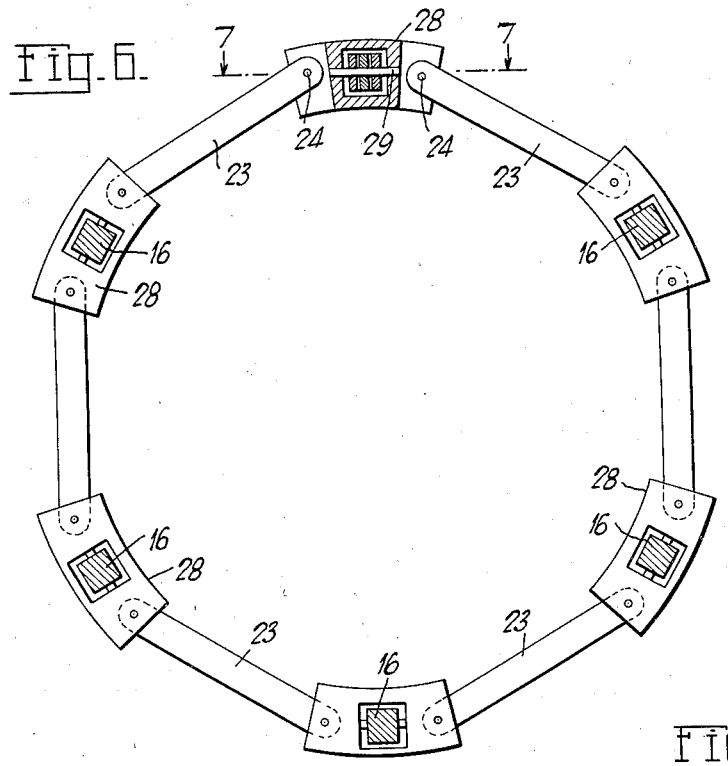
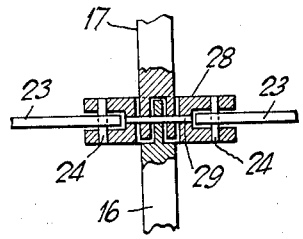
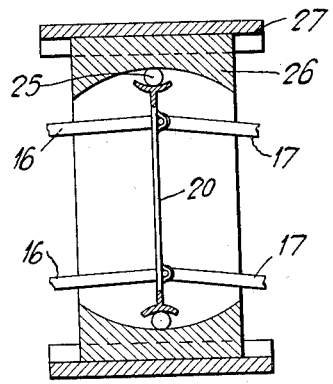
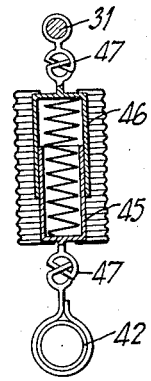
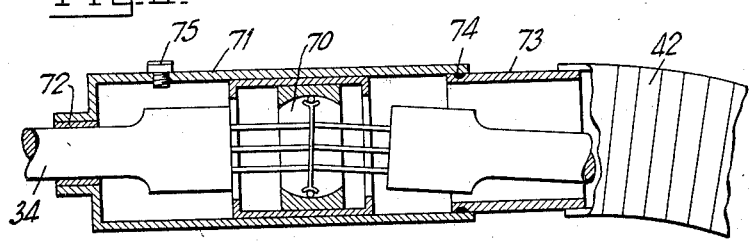
INVENTOR
Robert Rodger Glen
BY Watson, Bristol,
Johnson & Leavenworth
ATTORNEYS Dec. 3, 1935.  R. R. GLEN  2,022,909

SHAFT COUPLING

Filed Oct. 16, 1934  3 Sheets-Sheet 3

INVENTOR
Robert Rodger Glen
BY
Watson, Bristol, Johnson & Leavenworth
ATTORNEYS

Patented Dec. 3, 1935

2,022,909

UNITED STATES PATENT OFFICE 2,022,909

SHAFT COUPLING

Robert Rodger Glen, Anglet, France, assignor to Glen's Patents and Holdings Inc., New York, N. Y., a corporation of Delaware Application October 16, 1934, Serial No. 748,473
In Great Britain June 19, 1934

12 Claims. (Cl. 64—20)

This invention relates to improvements in couplings for transmitting driving force between two mutually inclined shafts and more particularly to that kind of coupling wherein the driving motion is transmitted from one shaft to the other by a plurality of rods, each comprising two portions lying at an angle to one another and each of which portions is slidable into and out from a longitudinal slot or recess formed in one of the shafts or in a boss or the like carried by the shaft.

A coupling of the kind above described has hitherto been used for transmitting a drive between two shafts, the axes of which intersect each other at right angles and is known as "Hobson's" coupling. If the angle between the axes is greatly reduced or increased so that the shafts become nearly coaxial, there is a tendency for the mechanism to bind owing to the obliquity of the forces to which the rods are subjected. One object of the present invention is to remove this disadvantage. Another object of the present invention is to render a coupling of the kind described operative over widely varying angles between the shafts (e. g. from the shafts in the "in line" position to an angle of 80° or even less between the shafts). That is to say, to make a flexible coupling.

According to one feature of the invention the points of junction of the portions of the rods aforesaid are constrained or guided to remain in a single plane with one another as the shafts rotate. It will be seen that, in theory, each of the points of junction aforesaid will describe an ellipse lying in a plane bisecting the angle between the axes of the two shafts and it is the tendency for the point of junction to move out of this plane which causes binding or jamming in the mechanism. By the present invention means are provided whereby all the points of articulation are positively guided or constrained in that plane so that the possibility of binding is eliminated.

According to another feature of the present invention the two portions of each rod aforesaid are pivoted together at their junction whereby the angle between the axes of the two shafts may be varied and the mechanism thus becomes a flexible drive. The two features above described may conveniently be combined in a single coupling to obtain a flexible coupling which will run properly over a range of angles of inclination of the shafts.

The means for constraining or guiding the point of junction of the two portions of each rod is preferably a plate or a ring connecting together the pivot points above mentioned in a plane lying at an angle to each shaft. In order that the pivot points may each describe the circle to which they are constrained by the plate or ring, instead of the ellipse as above mentioned, each portion of each rod is slidable in a longitudinal slot, hole, or recess in its associated shaft, which slot has a radial dimension substantially greater than the corresponding radial dimension of the portion of the rod received therein so that the rods may vary their angle in relation to the shaft as it rotates.

According to another feature of the present invention the coupling above described is applied to the power transmission system of a motor vehicle. In one such application, the coupling may replace the existing universal joint in the transmission system of the motor vehicle. In a further application, the improved coupling may be used in a transmission system for conveying the drive from a tractor-vehicle to the wheels or axles of a trailer-vehicle, or between articulated trailer-vehicles.

Other objects of the invention will in part be obvious and will in part appear hereinafter.

For a fuller understanding of the nature and objects of the invention reference should be had to the following detailed description taken in connection with the accompanying drawings, in which:

Fig. 1 is a side elevation of a coupling according to the invention in the fully extended position;

Fig. 2 is a section on the line 2—2 of Fig. 1;

Figs. 3 and 4 are a front and side elevation respectively, to an enlarged scale, of a portion of the connecting plate;

Fig. 5 is a side elevation showing an alternative construction;

Fig. 6 is a view, partly in section, illustrating a further modification;

Fig. 7 is a section of a detail taken on the line 7—7 in Fig. 6;

Fig. 8 is a view showing the connecting plate of the coupling supported in a self-aligning bearing;

Fig. 10 is a view, partly in section, of the intermediate supports for the driving shaft in Fig. 9;

Fig. 11 is a sectional view to an enlarged scale of the arrangement at each end of the driving shaft shown in Fig. 9;

Figure 9:
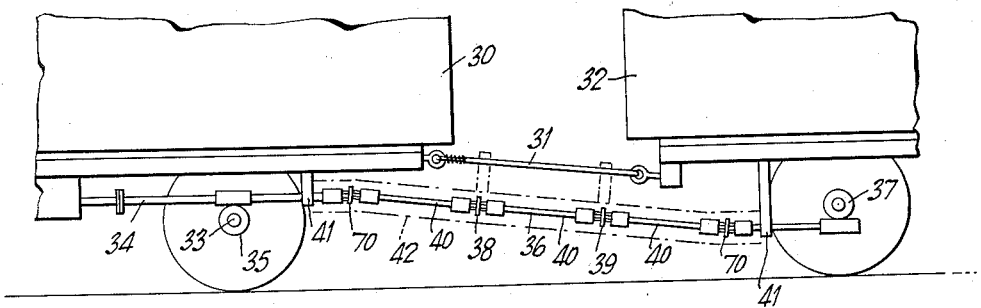
Fig. 9 illustrates the invention applied to the transmission of a tractor-trailer vehicle system and shows the arrangement of the flexible driving shaft.

Referring now to the drawings, and more particularly to Figs. 1 to 4, the coupling is shown as comprising two cylinders 10, 11, which are secured to the ends of the shafts 12, 13 between which a drive is to be transmitted. As can be seen from Figs. 1 and 2, each of the cylinders is formed with a series of longitudinal slots 14 running through them. These slots are conveniently formed by first slotting a central solid cylinder and then shrinking on a sleeve portion 15 to close the open sides of the slots.

Engaging each slot 14 is a rod 16 or 17 which has a working fit in the slot in a circumferential direction, but is capable of limited movement with respect to the slot in a radial direction.

Where the angle of inclination between shafts 12 and 13 is small, a convenient arrangement for articulating rods 16 and 17 is shown in Figs. 3 and 4. Here the ends of corresponding pairs of rods taken respectively from the series 16 and 17 are forked and pivoted together by pins 18; the pins are each supported in bearing lugs 19 formed on a circular disk or ring 20.

The coupling described above operates as follows:

If the shaft 12 is driven, the rods 16 will be rotated about the axis of the shaft, and at the same time will slide longitudinally with respect to the cylinder 10 so that their outer ends move in the plane in which they are constrained by their connection to the plate or ring 20. The plate 20 similarly rotates the rods 17 which by their engagement with the slots in the cylinder 11 transmit the drive to the shaft 13. It will be seen that the path of movement of the end of each rod where it is connected to the plate 20 is a circle which is at an oblique angle to the axes of the shafts 12, 13, and the projection of this circle on a plane normal to either of these axes is an ellipse. Lost motion about the pin 18 in the rods 16 and 17 accommodates the lateral bending at the joint. Also it is found that a small oscillation of the plate occurs due to the fact that only a finite number of rods are employed and that in consequence the path of the ends of the rods varies from a true circle. This variation is, however, very small and may be disregarded.

Each rod 16 and 17 must, therefore, vary its angle in relation to its cylinder by movement in a radial direction as it is rotated about the axis of that cylinder, and it is for this reason that the rods are a loose fit, in a radial sense, in their respective slots.

A great advantage of couplings according to this invention is that by making the rods and slots sufficiently long the joints may be made extensible in a direction along the length of either shaft thus providing a coupling which not only adapts itself to relative angular movement of the coupled shafts but also movement of the shafts toward and away from one another. In order, however, that this latter movement may not result in the rods becoming too far withdrawn from their associated shafts they are preferably provided with abutments 50 which contact with the end of the sleeve 15.

With reference to Fig. 5, there is shown a modified form of connection between the rods 16 and 17 and the plate 20, which is adapted to provide articulation where the angle between the shafts is relatively great. The plate 20 in this case is formed with hemispherical depressions, each of which receives a ball 21 formed on the end of each rod. The bearing thus formed is closed by a plate 22 having a part-spherical surface so as to form with the plate 20 a socket for the ball. The sockets for the rods 16 and 17 are arranged alternately around the plate 20, although, in an alternative construction, the joints may be designed so that the axis of each rod intersects the axis of its companion in the other cylinder at a point in the plane of the ring, as in the example described with reference to Figs. 3 and 4.

In the modification shown in Figs. 6 and 7, the plate 20 is replaced by a hinged polygon composed of links 23 pivoted by pins 24 to members 28. The ends of each pair of rods 16 and 17 are conveniently articulated, for example, as described in relation to Figs. 1 to 4 but in this modification the pivoted ends of each pair are shown as received in a slot cut in the associated member 28 and the pivot pin 29 is supported in the member 28.

With this arrangement the oscillating movement of the rods radially in their cylinders, referred to above, is largely reduced because the polygon 23 is able to distort itself during operation into an ellipse of a shape approximating to that which the pivoted ends of the pins would theoretically follow, while at the same time constraining these ends to move in the same plane.

Where the coupling is to be used for transmitting considerable power as will be described below, it is desirable in some circumstances, to provide the plate 20 with a bearing so as to give the coupling support at this point. Fig. 8 shows one form of bearing for this purpose. The plate 20 is formed on its periphery with a ball-race for balls 25 which engage a spherical inner surface of an outer race 26. The outer race 26 is slidable on longitudinal guides 27. It will be seen that although the plate 20 is supported, the angle between the two shafts 12 and 13 may be varied and the distance apart of the cylinders 10 and 11 may also be varied, such movement being accommodated by tilting of the plate 20 in the race 26 and sliding of the race 26 in the guides 27 respectively.

As shown in Fig. 9, a tractor-vehicle 30 is connected by means of a draw-bar 31 to a trailer-vehicle 32. The back axle 33 of the tractor-vehicle is driven in the usual way by means of a transmission shaft 34 having a worm which meshes with the worm wheel of a differential gear housed in a casing 35. According to this invention the transmission shaft 34 is extended rearwardly beyond the casing 35 and is equipped with one of the shaft couplings 70 (shown in detail in Fig. 11) according to the invention, to drive an intermediate transmission shaft 36, the other end of which drives another of the flexible couplings according to the invention to transmit the drive to a differential gear 37 in the axle of the trailer-vehicle 32. In this way the wheels of the trailer-vehicle are positively driven. The couplings according to the invention are suitable for large variations in the angle between the shafts but they operate at their maximum efficiency at angles greater than about 165° and in order to obtain this efficiency and also in order to obtain sufficient extensibility, the intermediate shaft 36 is itself composed of two couplings 38, 39 according to the invention and appropriate short lengths of rigid shaft 40.

The transmission shaft 34 is supported in an additional bearing 41 at a point behind the differential gear 35 and the flexible couplings and intermediate shafts are encased in a single length of flexible metal tube 42 which is provided with suitable means for lubricating the various moving parts. The flexible tube is supported at points corresponding to the intermediate couplings 38, 39 by means of devices as shown in Fig. 10. These devices are themselves supported from the draw-bar 31 and consist of a pair of interfitting cylinders 45 and 46 surrounded by a flexible sealing sleeve and having a tension spring between their ends. The cylinders 45 and 46 are secured respectively to the metal tube 42 and to the draw-bar 31 by universal joints 47.

Oil-tight glands are preferably provided at each end of the flexible tube together with means for supplying lubricant to the working parts as shown in Fig. 11 in which the coupling 70, that is shown as of the kind illustrated in Fig. 8, is enclosed and supported by a sleeve 71, which may itself be supported from the chassis of the vehicle and is provided with an oil-tight gland 72 through which the shaft 34 is introduced. The end of the flexible housing 42 is provided with a sleeve 73 which slides inside the sleeve 71 and carries an oil scraper ring 74 bearing against the interior of the sleeve 71. Lubricant is admitted to the housing in any suitable manner, for example, through orifice 75. In the type of transmission shown, advantage is taken of the oscillating motion of the rods in their slots to force a circulation of lubricant over the working parts. This in effect provides a pressure pump for forcing the circulation of the lubricant.

The extension to the shaft 34 behind the casing 35 is preferably provided with a readily detachable connection to the shaft 34 so that the drive to the tractor vehicle may be discontinued when the tractor is not required.

From the description of Figs. 9 to 11 given above, it will be seen that the present invention makes possible a transmission of power from a tractor-vehicle to a trailer-vehicle which will accommodate relative vertical and horizontal movement between the two vehicles and also extensions in the draw-bar 31.

Figure 12:
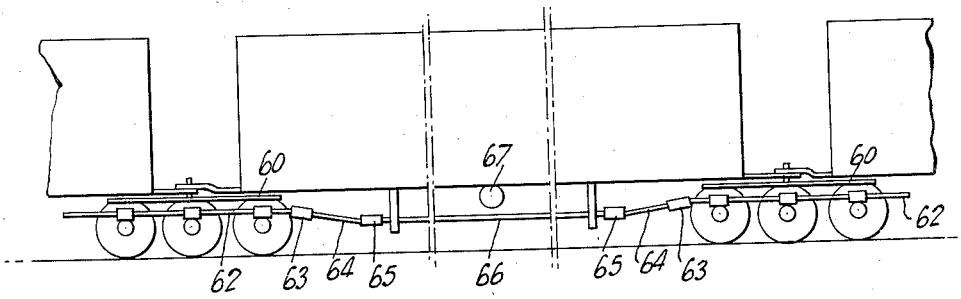
Fig. 12 is an elevation showing the application of the invention to an articulated railway train.
Figure 13:
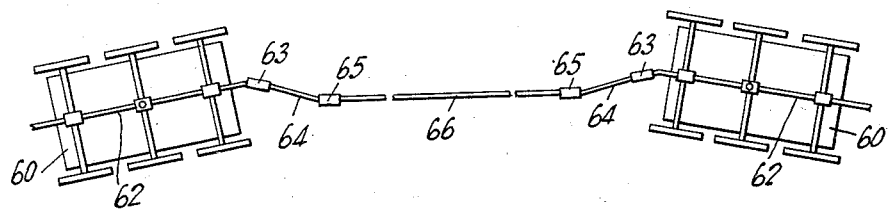
Fig. 13 is a plan view of the arrangement shown in Fig. 12 with the vehicle bodies removed.

A further application of the invention is to the driving of the wheels of articulated trailer railway vehicles and an example of one way of carrying this application into effect is shown in Figs. 12 and 13 which illustrate the manner in which the drive is carried from one bogie to the next bogie along the train. Referring to Fig. 13, the drive to the axles of the bogie 60 is taken (by means of worm and worm wheels) from a shaft 62 above and at right angles to the bogie axles. At the end of the shaft 62 is a coupling 63 of the kind according to the invention which couples the shaft to a comparatively short intermediate shaft 64 which itself is coupled by means of a further coupling 65 according to the invention to a shaft 66 extending along the vehicle. This arrangement is duplicated at the other end of the vehicle to transmit the drive to the bogie at that end, as shown. The shaft 62 is supported in bearings on the bogie and the shaft 66 by bearings suspended from the frame of the vehicle while the intermediate shafts 64 being comparatively short do not require supporting although it is preferable that the couplings 63 and 65 be of the type described above with reference to Fig. 8. In order to enable the shaft 66 to clear any portions of the frame that may be below the level of the shafts 62 (e. g. on air tank 67) the shafts 64 may slope downwardly from the bogies as indicated in Fig. 12. Alternately, a further coupling supported from the center of the frame may be employed and the shaft 66 divided into two portions each sloping downwardly to that coupling.

The invention may be applied wherever two mutually inclined shafts are to be driven. The invention, however, is particularly applicable when the angle of inclination between the shafts is wide or where there is backlash or lost motion between the shafts or where the angle of inclination is constantly or intermittently changed. The invention is particularly useful in providing a drive for mechanism having a wide range of adjustments involving the moving of the driving shafts, such as in the drive of the interrupter or chopper in a moving picture projecting machine.

The parts here employed are readily accessible for lubrication. Housings, however, may be and preferably are employed about the coupling which hold lubricant in proper association with the parts. Such housings may be provided with antifriction supports for the moving parts, as illustrated in Fig. 11, or may have rigid supports, for example, a ball-bearing runway for supporting the edges of links 28 shown in Fig. 6.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desired to secure by Letters Patent is:

1. In couplings for transmitting driving force, the combination with two mutually inclined shafts, of a plurality of rods in force transmitting engagement with adjacent ends of each of said shafts, means for articulating said rods in pairs which engage said shafts, and means for constraining said articulating means in a plane.

2. In couplings for transmitting driving force, the combination with two mutually inclined shafts, provided with a plurality of corresponding slots disposed axially about the peripheries of their adjacent ends, of a plurality of rods disposed in working engagement with said slots, means for articulating together the pairs of rods in corresponding slots, and means for constraining the articulating means substantially in the plane of intersection of said shafts when produced.

3. In couplings for transmitting driving force, the combination with two mutually inclined shafts, provided with a plurality of corresponding slots disposed axially about the peripheries of their adjacent ends, of a plurality of rods disposed in working engagement with said slots, means for articulating together the pairs of rods in corresponding slots, and a rigid circular plate arranged to carry said articulating means.

4. In couplings for transmitting driving force, the combination with two mutually inclined shafts, provided with a plurality of corresponding slots disposed axially about the peripheries of their adjacent ends, of a plurality of rods disposed in working engagement with said slots, said rods being formed to have a radial dimension less than corresponding dimension of the slot with which it works, pivot means joining the rods in corresponding slots whereby said rods are free to assume varying angular relations, and a rigid plate for constraining said pivot means substantially in the plane of the intersection of said shafts when produced.

5. In couplings for transmitting driving force, the combination with two mutually inclined shafts, provided with a plurality of corresponding slots disposed axially about the peripheries of their adjacent ends, of a plurality of rods disposed in working engagement with said slots, means for articulating together the pairs of rods in corresponding slots, and a polygonal linkage connecting said articulating means and arranged to constrain the same to move in a plane.

6. In couplings for transmitting driving force, the combination with two mutually inclined shafts, provided with a plurality of corresponding slots disposed axially about the peripheries of their adjacent ends, of a plurality of rods disposed in working engagement with said slots, guard means on the ends of said shafts for preventing said rods moving axially out of said slots, said rods being dimensioned axially so as to be capable of limited axial movement in said slots, means for articulating together the pairs of rods in corresponding slots, and means for constraining the articulating means for movement substantially in a plane.

7. In couplings for transmitting driving force, the combination with two mutually inclined shafts, provided with a plurality of corresponding slots disposed axially about the peripheries of their adjacent ends, of a plurality of rods disposed in working engagement with said slots, guard means on the ends of said shafts for preventing said rods moving axially out of said slots, means associated with the ends of said rods for engaging with said guard means to limit the axial movement of said rods in said slots, means for articulating together the pairs of rods in corresponding slots, and means for constraining the articulating means for movement substantially in a plane.

8. In couplings for transmitting driving force, the combination with two mutually inclined shafts, provided with a plurality of corresponding slots disposed axially about the peripheries of their adjacent ends, of a plurality of rods disposed in working engagement with said slots, means for articulating together the pairs of rods in corresponding slots, means for constraining said articulating means for movement substantially in a plane, housing means disposed about said shafts and provided with a flexible joint in the region where said shafts intersect when produced, and antifriction means for supporting said constraining means in said housing means at said joint.

9. A coupling of the character set forth in claim 8, in which the housing means is disposed about the shafts and constructed to hold lubricant for lubricating the shafts and the coupling parts.

10. A coupling of the character set forth in claim 8, in which the antifriction means for supporting the constraining means includes a block which carries the constraining means, said block being arranged to have limited axial movement with respect to said housing means.

11. A coupling of the character set forth in claim 8, in which the antifriction means supporting the constraining means includes a block supported by said housing means and provided with a spherical internal race-way with which the constraining means engages in an antifriction manner and in varying equitorial zones depending on the angle through which the mutually inclined shafts drive.

12. A coupling of the character set forth in claim 8, in which the housing holds lubricant and the rods in engagement with slots are arranged to force circulation of the lubricant through the slots and about the parts within the housing.

ROBERT RODGER GLEN.